United States Patent
Chang

(10) Patent No.: US 9,652,003 B2
(45) Date of Patent: May 16, 2017

(54) HEAT DISSIPATION ASSEMBLY AND PORTABLE ELECTRONIC DEVICE EMPLOYING SAME

(71) Applicant: FIH (HONG KONG) LIMITED, Kowloon (HK)

(72) Inventor: Ching-Shiang Chang, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 92 days.

(21) Appl. No.: 14/678,606

(22) Filed: Apr. 3, 2015

(65) Prior Publication Data
US 2016/0116950 A1    Apr. 28, 2016

(30) Foreign Application Priority Data
Oct. 28, 2014    (TW) .............................. 103137136 A

(51) Int. Cl.
| H05K 7/20 | (2006.01) |
| G06F 1/20 | (2006.01) |
| G06F 1/16 | (2006.01) |

(52) U.S. Cl.
CPC ............ *G06F 1/203* (2013.01); *G06F 1/1626* (2013.01)

(58) Field of Classification Search
CPC . G06F 1/181–1/182; H05K 7/20218–7/20381; H05K 7/20409–7/20418; H05K 7/20009–7/202; H01L 23/367–23/3677; H01L 23/473; H01L 23/46–23/467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

| 2002/0064024 | A1* | 5/2002 | McCullough | G06F 1/203 361/679.54 |
| 2004/0105233 | A1* | 6/2004 | Lai | H05K 7/202 361/695 |
| 2004/0179342 | A1* | 9/2004 | Pritchard | H05K 5/023 361/715 |
| 2005/0111194 | A1* | 5/2005 | Sohn | H01L 23/3672 361/704 |
| 2006/0274506 | A1* | 12/2006 | Huang | H04B 1/036 361/704 |
| 2007/0097628 | A1* | 5/2007 | Pais | G06F 1/203 361/695 |
| 2009/0009945 | A1* | 1/2009 | Johnson | G06F 1/1613 361/679.27 |
| 2009/0009957 | A1* | 1/2009 | Crooijmans | G06F 1/1632 361/679.41 |
| 2009/0168311 | A1* | 7/2009 | Hung | G06F 1/1626 361/679.01 |
| 2009/0168335 | A1* | 7/2009 | Tang | E05B 65/006 361/679.55 |

(Continued)

*Primary Examiner* — Anthony Haughton
*Assistant Examiner* — Razmeen Gafur
(74) *Attorney, Agent, or Firm* — Steven Reiss

(57) ABSTRACT

A heat dissipation assembly includes a main body, a heat conductor element, and a heat dissipation member. The heat conductor element is mounted to the main body and in thermal conductive contact with at least one electronic component. The heat dissipation member is mounted to the main body and is in thermal conductive communication with the heat conductor element. The heat generated by the at least one electronic component is transmitted through the heat conductor element to the heat dissipation member.

15 Claims, 4 Drawing Sheets

(56) References Cited

U.S. PATENT DOCUMENTS

| | | | |
|---|---|---|---|
| 2009/0175003 A1* | 7/2009 | Ali | G06F 1/203 361/695 |
| 2009/0180049 A1* | 7/2009 | Lee | G09F 9/35 349/58 |
| 2009/0195983 A1* | 8/2009 | Reichert | G06F 1/203 361/697 |
| 2010/0008028 A1* | 1/2010 | Richardson | G06F 1/1626 361/679.01 |
| 2010/0053854 A1* | 3/2010 | Nishikawa | G06F 1/1626 361/679.01 |
| 2010/0091439 A1* | 4/2010 | Horii | H04M 1/0249 361/679.01 |
| 2010/0134973 A1* | 6/2010 | Lee | H04M 1/0216 361/679.56 |
| 2010/0205622 A1* | 8/2010 | Snider | H04B 1/082 720/652 |
| 2011/0053651 A1* | 3/2011 | Miyashita | G06F 1/1616 455/566 |
| 2011/0255244 A1* | 10/2011 | Foxenland | G06F 1/203 361/688 |
| 2012/0050988 A1* | 3/2012 | Rothkopf | H04M 1/0266 361/688 |
| 2012/0327327 A1* | 12/2012 | Joo | H05K 1/189 349/58 |
| 2013/0027892 A1* | 1/2013 | Lim | H04M 1/185 361/748 |
| 2013/0114199 A1* | 5/2013 | Jung | H01H 13/702 361/679.09 |
| 2013/0141870 A1* | 6/2013 | Rothkopf | G06F 1/1626 361/707 |

* cited by examiner

HEAT DISSIPATION ASSEMBLY AND PORTABLE ELECTRONIC DEVICE EMPLOYING SAME

CROSS-REFERENCE TO RELATED APPLICATIONS

This application claims priority to Taiwanese Patent Application No. 103137136 filed on Oct. 28, 2014, the contents of which are incorporated by reference herein.

FIELD

The subject matter herein generally relates to heat dissipation assemblies, and particular to a heat dissipation assembly for a portable electronic device.

BACKGROUND

Heat dissipation assemblies are found in portable electronic devices, such as mobile phones, laptops, or personal digital assistants (PDAs), for removing heat generated by heat-generating electronic components, such as central processing units or other electronic components. However, portable electronic devices have become smaller and more compact. Effectively dissipating heat becomes critical to the work life of internal electronic components of the portable electronic device.

BRIEF DESCRIPTION OF THE DRAWINGS

Implementations of the present technology will now be described, by way of example only, with reference to the attached figures.

DETAILED DESCRIPTION

Figure 1:
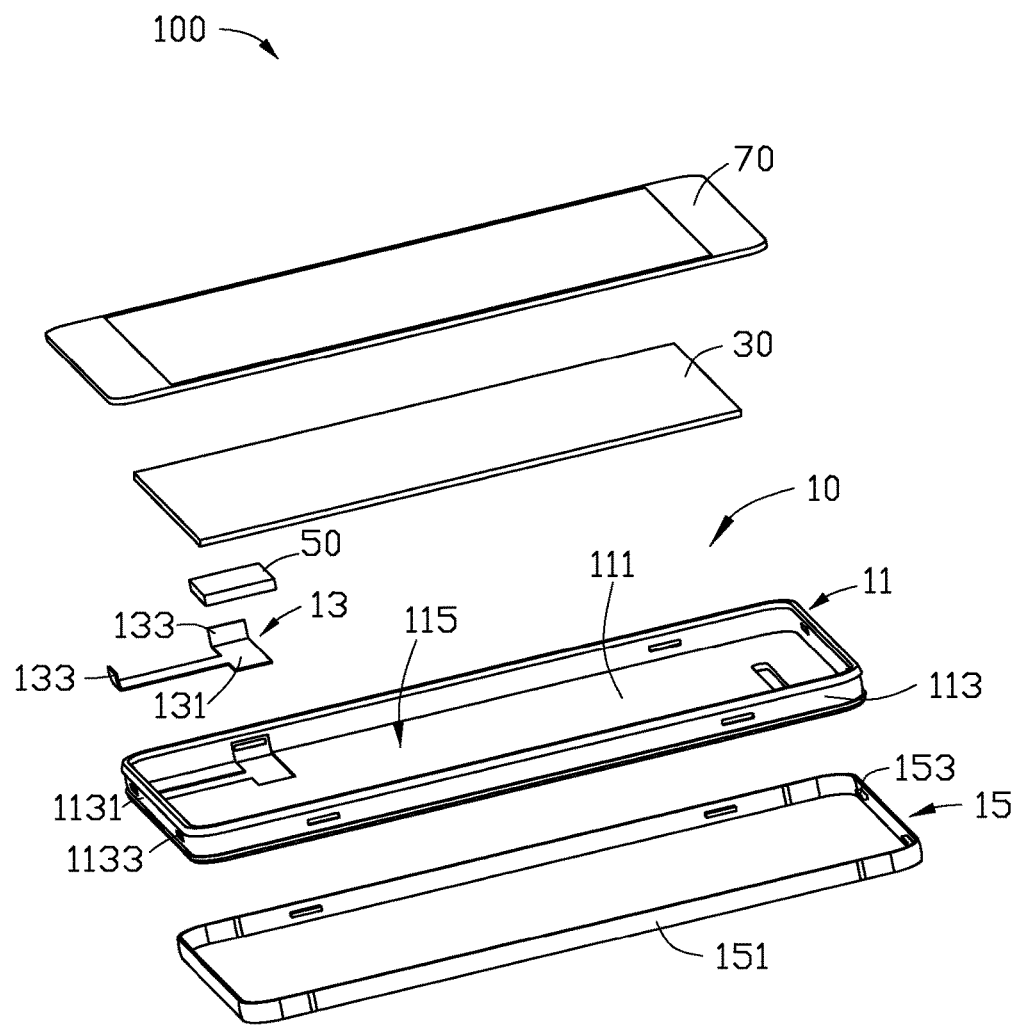
FIG. 1 is an exploded, isometric view of an embodiment of a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of a portable electronic device 100. The portable electronic device 100 may be a mobile phone, a personal digital assistant (PDA), or a handheld computer. The portable electronic device 100 includes a heat dissipation assembly 10, a circuit board 30, at least one electronic component 50, and a cover 70.

The heat dissipation assembly 10 includes a main body 11, a heat conductor element 13, and a heat dissipation member 15. The main body 11 is substantially a hollow cavity and can be a portion of a housing of the portable electronic device 100. The main body 11 includes a bottom wall 111 and a peripheral wall 113. The peripheral wall 113 extends substantially perpendicularly from a periphery of the bottom wall 111 and cooperatively forms a receiving space 115 with the bottom wall 111. The receiving space 115 is configured to receive the circuit board 30, the electronic component 50, and the cover 70.

A mounting slot 1131 is defined at an exterior surface of the peripheral wall 113. The mounting slot 1131 is substantially a loop structure. At least one receiving hole 1133 is defined at a bottom surface of the mounting slot 1131. In this embodiment, the receiving holes 1133 are substantially rectangular. The receiving holes 1133 pass through the peripheral wall 113 and are in communication with the receiving space 115.

The heat conductor element 13 can be made of a heat conducting material, for example, copper, aluminum, and iron, for conducting heat generated by the electronic component 50. The heat conductor element 13 includes a mounting portion 131 and at least one resisting portion 133. The mounting portion 131 is substantially T-shaped and can be mounted to the bottom wall 111 of the main body 11 via glue or the like. In this embodiment, there are two resisting portions 133. One resisting portion 133 extends substantially perpendicularly from one end of the mounting portion 131 and is mounted to an interior surface of the peripheral wall 131 for covering one receiving hole 1133. The other resisting portion 133 extends substantially perpendicularly from the other end of the mounting portion 131 and is also mounted to the interior surface of the peripheral wall 131 for covering another receiving hole 1133.

The heat dissipation member 15 can be made of a heat conducting material, for example, copper, aluminum, and iron, for dissipating the heat from the heat conductor element 13. The heat dissipation member 15 includes a frame 151 and a plurality of flanges 153. The frame 151 has substantially the same shape and size as the main body 11 and is received in the receiving slot 1131 of the main body 11. A number of the flanges 153 corresponds to a number of the receiving holes 1133. The flanges 153 protrude from an interior surface of the frame 151. The flanges 153 are aligned with and inserted into the receiving holes 1133 so as to mount the heat dissipation member 15 to the mounting slot 1131 of the main body 11. Two flanges 153 of the heat dissipation member 15 abut against the resisting portions 133 of the heat conductor element 13, and then the heat dissipation member 15 is coupled to the heat conductor element 13 through the flanges 153 resisting against the resisting portions 133.

The circuit board 30 is received in the receiving space 115. The electronic component 50 is positioned on a surface of the circuit board 30 adjacent to the bottom wall 111 of the main body 11 and resists the mounting portion 131 of the heat conductor element 13. In this embodiment, the electronic component 50 can be a central processing unit, a display module or other electronic element. The electronic component 50 is electronically connected to the circuit board 30 so as to performance functions for generating heat.

The cover 70 has a shape and a size corresponding to a shape and a size of the main body 11. The cover 70 is configured to attached to, bonded with, or assembled with the main body 11 and covers the main body 11.

Figure 2:
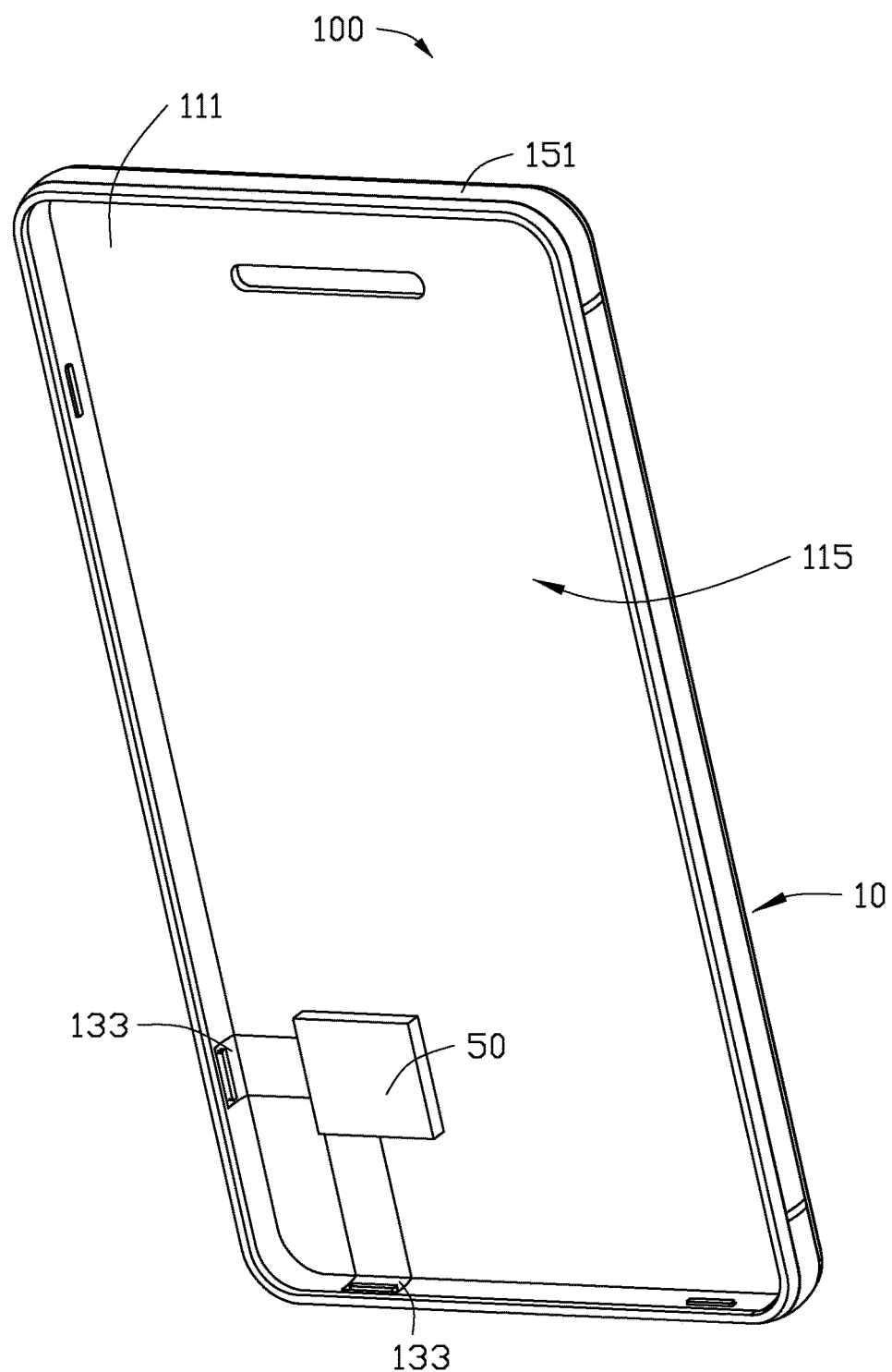
FIG. 2 is a partly assembled view of the portable electronic device of FIG. 1.
Figure 3:
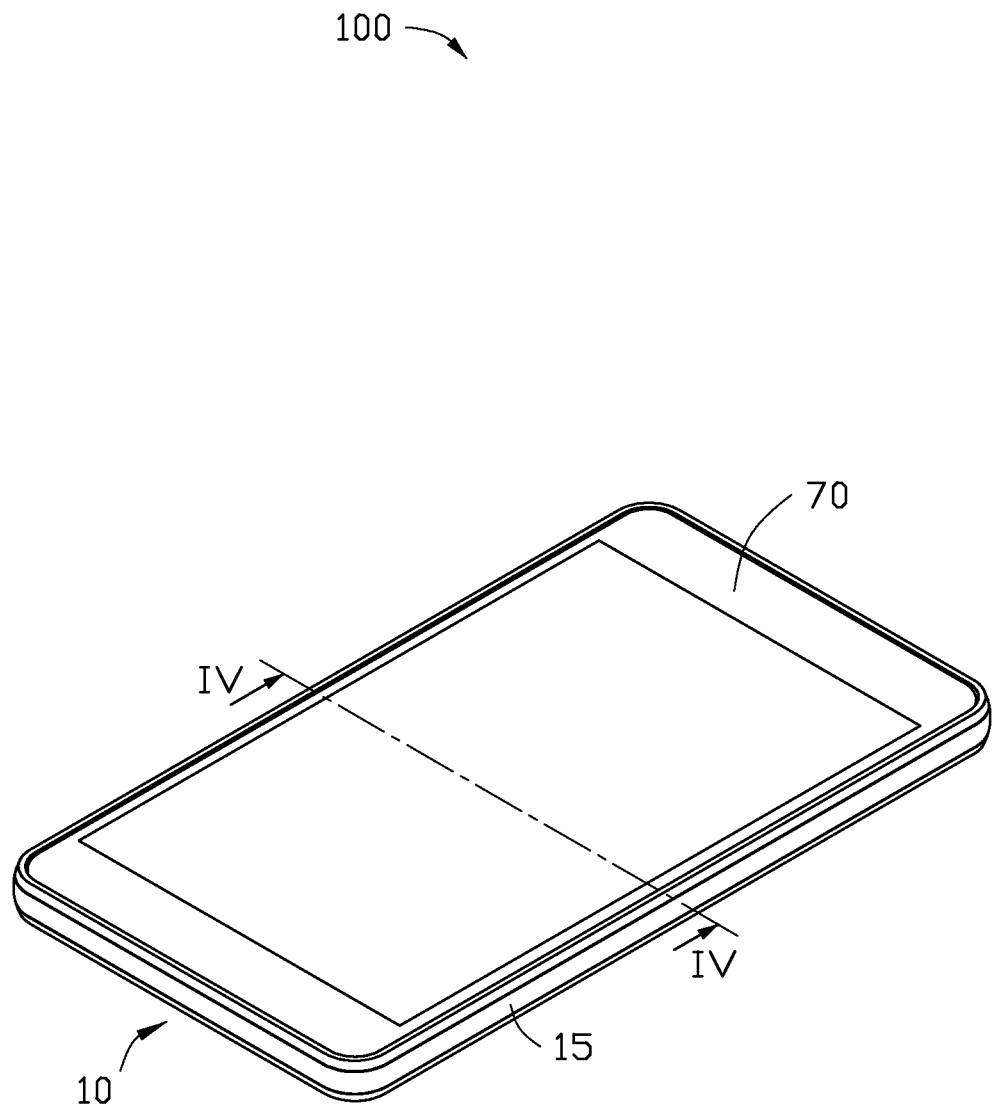
FIG. 3 is an assembled, isometric view of the portable electronic device of FIG. 1.

FIGS. 2-3 show an assembly of the portable electronic device 100. In detail, the mounting portion 131 of the heat conductor element 13 is mounted to the bottom wall 111 of the main body 11 via glue or the like. The two resisting portions 133 of the heat conductor element 13 are mounted to the peripheral wall 113 of the main body 11 and aligned with corresponding receiving holes 1133.

The frame 151 of the heat dissipation member 15 is aligned with the mounting slot 1131 and the flanges 153 are aligned with the receiving holes 1133. The heat dissipation member 15 is pressed, then the frame 151 is mounted to the mounting slot 1131 of the main body 11. One flange 153 passes through a receiving hole 1133 and resists one resisting portion 133 of the heat conductor element 13. Another flange 153 passes through another receiving hole 1133 and resists the other resisting portion 133 of the heat conductor element 13. In this way, the heat dissipation member 15 is assembled to the main body 11 and contacts with the heat conductor element 13.

The circuit board 30 with the electronic component 50 is received in the receiving space 15 of the main body 11 and one side of the circuit board 30 having the electronic component 50 faces the heat conductor element 13. The cover 70 is positioned above and covers the main body 11. Thus, the portable electronic device 100 is completely assembled.

Figure 4:
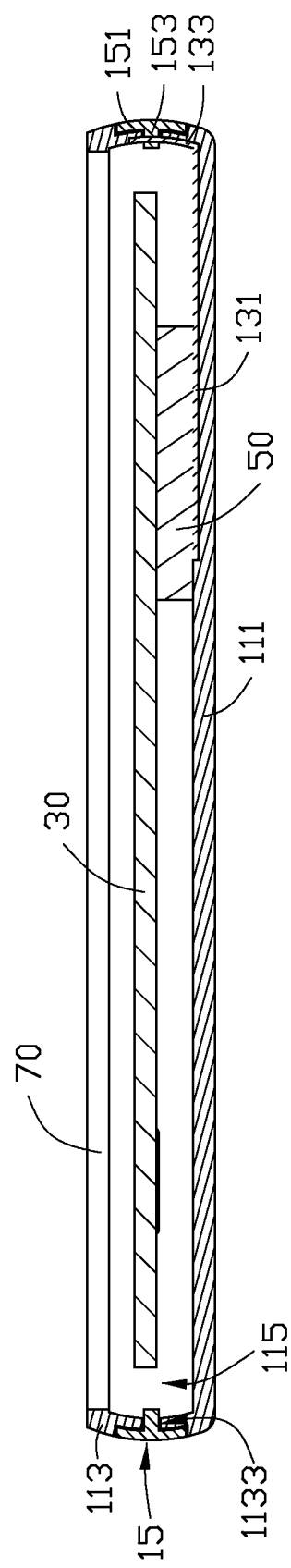
FIG. 4 is a cross-sectional view taken along line IV-IV of FIG. 3.

Referring to FIG. 4, in use of the portable electronic device 100, the circuit board 30 is powered on. The electronic components 50 on the circuit board 30 are activated to performance functions and generate heat. Due to the electronic components 50 abutting against the conductor 13, the heat generated by the electronic components 50 are transmitted to heat dissipation member 15 via the resisting portion 133 of the heat conductor element 13 and the flanges 153. That is, the heat generated by the electronic components 50 can be dissipated to the outside of the portable electronic device 100 through the heat dissipation member 15, thereby improving a dissipation speed of portable electronic device 100.

In other embodiments, the heat conduction member 13 can be integrated with the main body 11.

In other embodiments, the number of the resisting portions 133 can be adjusted according to a requirement of a user. For example, there are a plurality of resisting portions 133, which will increase a touch area of the heat conductor element 13 and the heat dissipation member 15, so that the heat conductor element 13 can speedily transmit the heat to the heat dissipation member 15.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A heat dissipation assembly comprising:
   a main body for receiving at least one electronic component, wherein a mounting slot is defined at an exterior surface of a peripheral wall of the main body and a plurality of receiving holes are defined in the mounting slot;
   a heat conductor element mounted to the main body and in thermal conductive contact with the at least one electronic component; and
   a heat dissipation member mounted to the main body and in thermal conductive communication with the heat conductor element allowing heat generated by the at least one electronic component to be transmitted through the heat conductor element to the heat dissipation member;
   wherein the heat dissipation member comprises a frame and a plurality of flanges, the frame is mounted to the mounting slot, the plurality of flanges protrude from an interior surface of the frame and pass through the receiving holes.

2. The heat dissipation assembly of claim 1, wherein the main body comprises a bottom wall and the peripheral wall, the peripheral wall extends substantially perpendicularly from a periphery of the bottom wall and cooperatively forms a receiving space with the bottom wall, the heat conductor element is received in the receiving space.

3. The heat dissipation assembly of claim 1, wherein the heat dissipation member is received in the mounting slot.

4. The heat dissipation assembly of claim 3, wherein the plurality of receiving holes passes through the peripheral wall and is in communication with the receiving space.

5. The heat dissipation assembly of claim 1, wherein the heat conductor element comprises a mounting portion and two resisting portions extending substantially perpendicularly from the mounting portion, the mounting portion is assembled to the bottom wall of the main body, the two resisting portions are mounted to the peripheral wall of the main body and are aligned with the receiving holes to resist the flanges.

6. The heat dissipation assembly of claim 1, wherein the heat conductor element is made of a heat conducting material.

7. The heat dissipation assembly of claim 1, wherein the heat dissipation member is made of a heat conducting material.

8. A portable electronic device comprising:
   an electronic component; and
   a heat dissipation assembly comprising:
      a main body for receiving the electronic component, wherein a mounting slot is defined at an exterior surface of a peripheral wall of the main body and a plurality of receiving holes are defined in the mounting slot;
      a heat conductor element mounted to the main body and in thermal conductive contact with the electronic component; and
      a heat dissipation member mounted to the main body and in thermal conductive communication with the heat conductor element allowing heat generated by the electronic component to be transmitted through the heat conductor element to the heat dissipation member;

wherein the heat dissipation member comprises a frame and a plurality of flanges, the frame is mounted to the mounting slot, the plurality of flanges protrude from an interior surface of the frame and pass through the receiving holes.

9. The portable electronic device of claim 8, wherein the main body comprises a bottom wall and the peripheral wall, the peripheral wall extends substantially perpendicularly from a periphery of the bottom wall and cooperatively forms a receiving space with the bottom wall, the heat conductor element is received in the receiving space.

10. The portable electronic device of claim 8, wherein the heat dissipation member is received in the mounting slot.

11. The portable electronic device of claim 10, wherein the plurality of receiving holes passes through the peripheral wall and is in communication with the receiving space.

12. The portable electronic device of claim 8, wherein the heat conductor element comprises a mounting portion and two resisting portions extending substantially perpendicularly from the mounting portion, the mounting portion is assembled to the bottom wall of the main body, the two resisting portions are mounted to the peripheral wall of the main body and are aligned with the receiving holes to resist the flanges.

13. The portable electronic device of claim 8, wherein the heat conductor element is made of a heat conducting material.

14. The portable electronic device of claim 8, wherein the heat dissipation member is made of a heat conducting material.

15. A heat dissipation assembly comprising:

a main body forming a receiving space for receiving at least part of at least one electronic component, the main body having an interior surface facing the receiving space and an exterior surface facing away from the receiving space, wherein a mounting slot is defined at the exterior surface of a peripheral wall of the main body and a plurality of receiving holes are defined in the mounting slot;

a heat conductor element mounted to the interior surface of the main body and in thermal conductive contact with the at least one electronic component; and a heat dissipation member mounted to the exterior surface of the main body and in thermal conductive communication with the heat conductor element allowing heat generated by the at least one electronic component to be transmitted through the heat conductor element to the heat dissipation member;

wherein the heat dissipation member comprises a frame and a plurality of flanges, the frame is mounted to the mounting slot, the plurality of flanges protrude from an interior surface of the frame and pass through the receiving holes.

* * * * *